(12) United States Patent  
Matheson

(10) Patent No.: US 10,479,184 B2  
(45) Date of Patent: Nov. 19, 2019

(54) AUXILIARY ELECTRIC DRIVE SYSTEM AND VEHICLE USING SAME

(75) Inventor: Donald R. Matheson, Santa Clara, CA (US)

(73) Assignee: EVAOS, INC., Santa Clara, CA (US)

(\*) Notice: Subject to any disclaimer, the term of this patent is extended or adjusted under 35 U.S.C. 154(b) by 548 days.

(21) Appl. No.: 13/251,193

(22) Filed: Sep. 30, 2011

(65) Prior Publication Data

US 2012/0090911 A1    Apr. 19, 2012

Related U.S. Application Data

(60) Provisional application No. 61/388,438, filed on Sep. 30, 2010, provisional application No. 61/470,323, filed on Mar. 31, 2011.

(51) Int. Cl.  
*B60K 6/48* (2007.10)

(52) U.S. Cl.  
CPC ............ *B60K 6/48* (2013.01); *Y02T 10/6221* (2013.01); *Y02T 10/6269* (2013.01); *Y10T 29/49716* (2015.01); *Y10T 477/26* (2015.01)

(58) Field of Classification Search  
CPC ...... B60W 10/04; B60W 10/06; B60W 10/08; B60K 6/442; B60K 6/48  
USPC ................. 180/65.28, 65.285, 65.265, 65.26  
See application file for complete search history.

(56) References Cited

U.S. PATENT DOCUMENTS

| | | | |
|---|---|---|---|
| 7,497,285 B1 * | 3/2009 | Radev | B60K 6/26 180/65.225 |
| 8,169,115 B1 | 5/2012 | Monfort | |
| 8,226,524 B2 * | 7/2012 | Gloge | 477/3 |
| 8,360,929 B2 * | 1/2013 | Beer et al. | 477/5 |
| 8,414,450 B2 * | 4/2013 | Ueno et al. | 477/5 |
| 8,453,772 B2 * | 6/2013 | Brown | 180/65.285 |
| 8,474,556 B2 * | 7/2013 | Wang et al. | 180/65.22 |
| 8,480,536 B2 * | 7/2013 | Weiss et al. | 477/5 |
| 8,480,537 B2 * | 7/2013 | Sano et al. | 477/5 |
| 8,510,007 B2 * | 8/2013 | Mori et al. | 701/69 |
| 8,534,399 B2 * | 9/2013 | Soliman et al. | 180/65.21 |
| 8,535,200 B2 * | 9/2013 | Vyas et al. | 477/3 |
| 8,540,604 B1 * | 9/2013 | Nefcy et al. | 477/15 |
| 8,555,844 B2 * | 10/2013 | Van Druten et al. | 123/179.22 |
| 8,565,990 B2 * | 10/2013 | Ortmann et al. | 701/67 |
| 8,579,748 B2 * | 11/2013 | Kawasaki et al. | 475/5 |
| 8,579,759 B2 * | 11/2013 | Akebono et al. | 477/5 |
| 8,583,308 B2 * | 11/2013 | Miyazaki | 701/22 |
| 8,583,309 B2 * | 11/2013 | Kaita et al. | 701/22 |
| 8,589,005 B2 * | 11/2013 | Kaltenbach | 701/22 |
| 8,590,648 B2 * | 11/2013 | Poschmann et al. | 180/65.22 |
| 8,606,482 B2 * | 12/2013 | Carlhammar et al. | 701/101 |
| 8,645,042 B2 * | 2/2014 | Carlhammar et al. | 701/101 |
| 9,481,256 B2 * | 11/2016 | Arkus | B60L 11/1809 |
| 2004/0188154 A1 | 9/2004 | Carlson | |

(Continued)

*Primary Examiner* — Jeffrey J Restifo

(74) *Attorney, Agent, or Firm* — Dorsey & Whitney LLP

(57) ABSTRACT

An electric drive system adapted to utilize an existing vehicle with a combustion engine and to add an electric drive capability. Components of the system may be implemented rearward of the vehicle engine and transmission along the drivetrain. In some aspects, the system allows for combustions engine, electric motor, or combination powering of the vehicle. In some aspects, the vehicle's original secondary systems, such as air conditioning, and power steering, are able to be used in the electric motor only drive mode.

19 Claims, 8 Drawing Sheets

(56) References Cited

U.S. PATENT DOCUMENTS

| | | | |
|---|---|---|---|
| 2005/0205313 A1 | 9/2005 | Gilmore et al. | |
| 2006/0000650 A1* | 1/2006 | Hughey | B60K 6/26 180/65.25 |
| 2007/0161455 A1* | 7/2007 | King | B60K 6/26 477/3 |
| 2007/0169970 A1 | 7/2007 | Kydd | |
| 2007/0175681 A1* | 8/2007 | King et al. | 180/65.4 |
| 2007/0284164 A1 | 12/2007 | Hamstra et al. | |
| 2008/0217079 A1 | 9/2008 | Marsh et al. | |
| 2009/0223725 A1* | 9/2009 | Rodriguez | B60K 6/40 180/65.21 |
| 2009/0288894 A1 | 11/2009 | Rose | |
| 2014/0081563 A1* | 3/2014 | Wang et al. | 701/113 |

\* cited by examiner

AUXILIARY ELECTRIC DRIVE SYSTEM AND VEHICLE USING SAME

CROSS-REFERENCE TO RELATED APPLICATIONS

This application claims priority to U.S. Provisional Patent Application No. 61/388,438 to Matheson, filed Sep. 30, 2010, which is hereby incorporated by reference in its entirety. This application claims priority to U.S. Provisional Patent Application No. 61/470,323 to Matheson, filed Mar. 31, 2011, which is hereby incorporated by reference in its entirety.

BACKGROUND

Field of the Invention

The present invention relates to electric and hybrid vehicles.

Description of Related Art

Gas or Diesel engine powered vehicles typically achieve poor fuel efficiency in terms of miles per gallon. Electric vehicles are beginning to become more popular. Hybrid vehicles, which use both electric motors and combustion engines, are also seen in the marketplace What is need is a system and method to create a hybrid vehicle adapted to utilize an existing vehicle with a combustion engine, and to convert it into a hybrid vehicle.

SUMMARY

An electric drive system adapted to utilize an existing vehicle with a combustion engine and to add an electric drive capability. Components of the system may be implemented rearward of the vehicle engine and transmission along the drivetrain. In some aspects, the system allows for combustions engine, electric motor, or combination powering of the vehicle. In some aspects, the same auxiliary components, such as the power steering module, the air conditioning, and other components, are powered whether using the original combustion engine or the electric drive motor.

DETAILED DESCRIPTION

Figure 1:
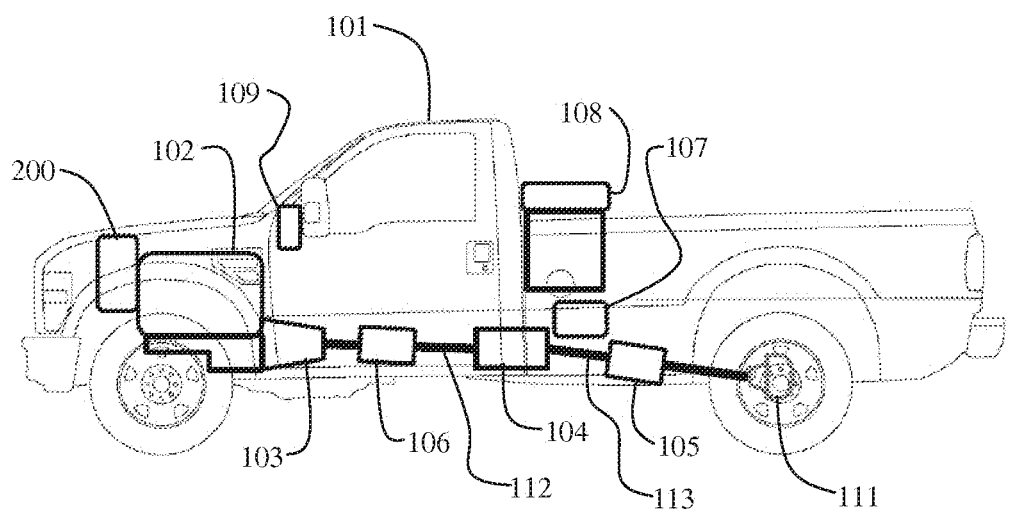
FIG. 1 illustrates a vehicle with an auxiliary electric drive system according to some embodiments of the present invention.

FIG. 1 illustrates an auxiliary electric drive system 100 with an auxiliary electric drive according to some embodiments of the present invention. In some aspects, the system 100 is implemented using a vehicle 101, which may be a pickup truck. In some aspects, the vehicle 101 has an OEM internal combustion engine 102 and an OEM transmission 103. In some aspects, the auxiliary electric drive system 100 is adapted to be retrofitted into existing vehicles, which may be new or used, while predominantly maintaining use of most portions of the original system. In some aspects, the system is adapted to allow for use of the OEM control system for the OEM internal combustion engine, while having separate electronics for the electric motor. In this sense, the system may have an electric motor sub-system and an OEM internal combustion engine sub-system which may be electrically independent while mechanically intertwined.

When retrofitting an existing vehicle which has an internal combustion engine with an electric drive system, some challenges exist with regard to other vehicle components. Typically, a vehicle with an internal combustion engine utilizes the rotation of that internal combustion engine to power one or more belts adapted to drive pulleys attached to the other vehicle components. Examples of these other drive components are the air conditioner, the power steering pump, the alternator, and other components. If the retrofitted vehicle is to be used in an electric only mode, using only the electric motor for propulsion, the internal combustion engine may not be running, or turning. Thus, the other vehicle components, which may still be required to properly operate the vehicle, may not be active. In some embodiments of the present invention, an additional part of the retrofit may include a modified belt drive system which allows other vehicle components to operate. In another aspect of the retrofit may include drive shaft disconnects which give the system opportunity to operate in numerous operational modes.

Figure 3:
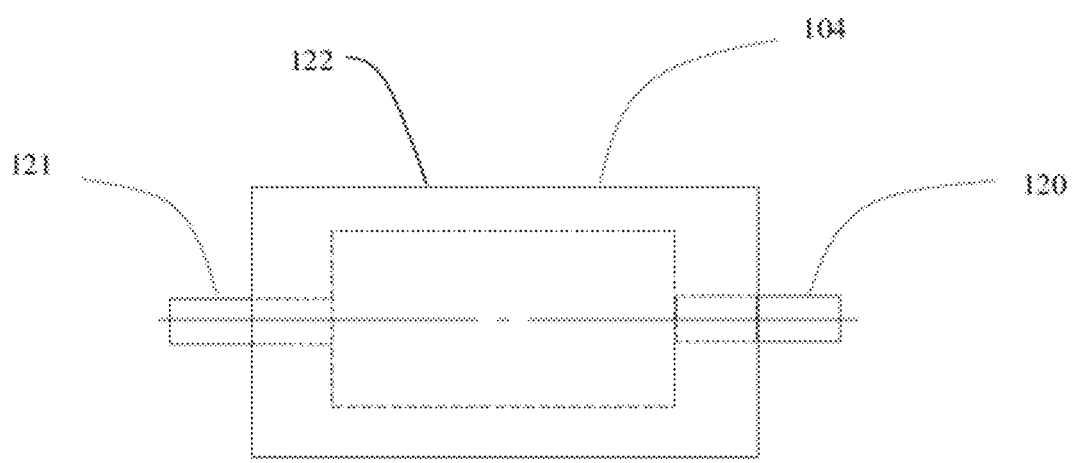
FIG. 3 illustrates an electric motor according to some embodiments of the present invention.

In some embodiments of the present invention, as seen in FIG. 3, the motor system is an inline motor which has a main motor axis which is co-axial with the mechanical torque transmission path. This may be a continuous or coupled shaft which is coupled to the front drive shaft on a first end, and is coupled to the rear drive shaft on a second end. The motor may be adapted to provide electrical assist to a vehicle already providing power with its combustion engine. This may be achieved using an electrical motor wherein the rotor of the motor is part of the inline drive train of the vehicle.

In some embodiments of the present invention, the system 100 may include an inline electric motor 104. The motor 104 may be hard mounted to the vehicle frame. As seen if FIG. 3, the electric motor 104 may be have a co-axial input shaft 121 and output shaft 120. In some embodiments, this may be a single piece shaft. The housing 122 of the electric motor 104 may be mounted to the vehicle 101. The electric drive system may be configured such that the electric motor 104 is mounted to the vehicle 101. A front drive shaft 112 is adapted to mechanically couple the transmission of the vehicle to the front end of the electric motor 104. A rear drive shaft 113 is adapted to mechanically couple the rear end of the electric motor 104 to the rear drive train components, which may include a differential 111.

In some embodiments, the electric motor 104 may be similar to a Power Flow 225, manufactured by Clean Wave Technologies, Inc., of Mountain View, CA, although modified to include a continuous through-shaft as described herein. The motor, and its associated drive control unit 107 (DCU), may have a peak system power density of 130 kW. The motor may be liquid cooled.

Figure 7A:
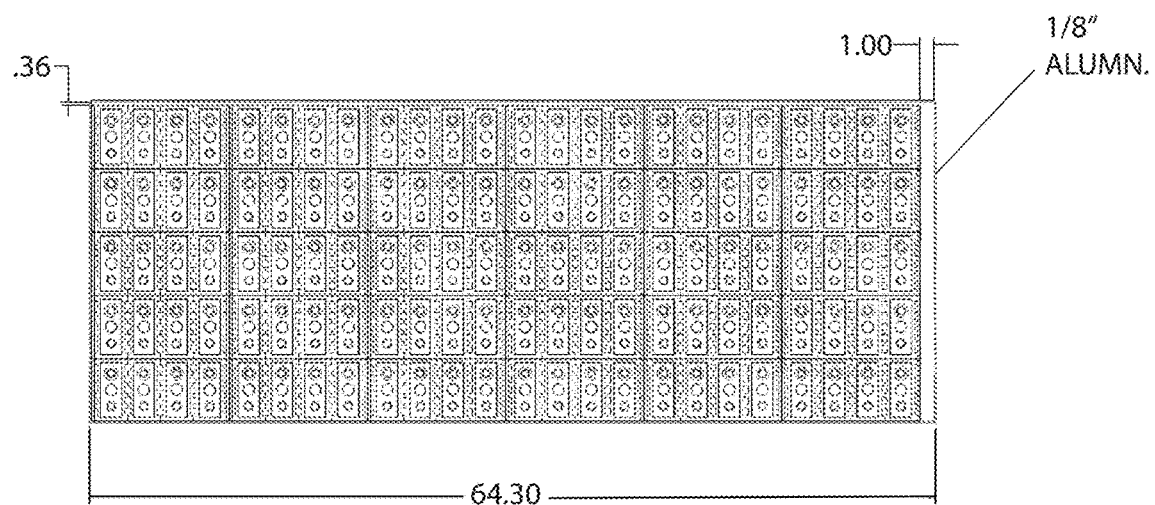
FIGS. 7A-C are views of a battery system according to some embodiments of the present invention.
Figure 7B:
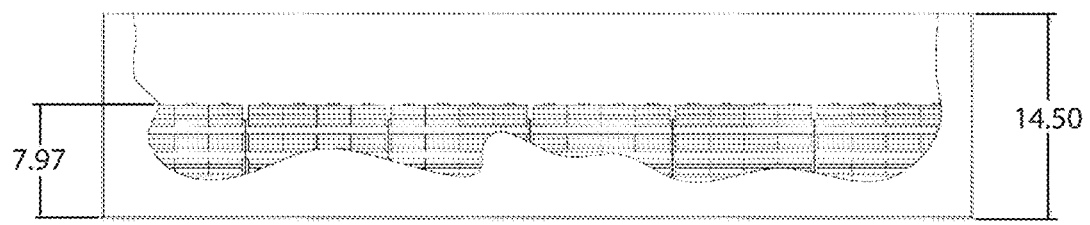
Figure 7C:
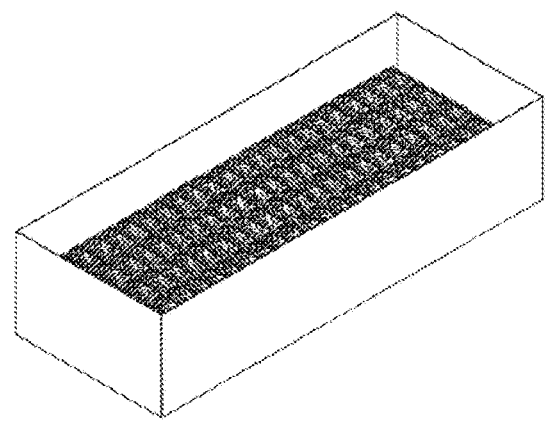

In some embodiments, as seen in FIGS. 7A-C, a battery system 108 may be used to power the electric drive system. The battery system 108 may be charged using external power, or may be charged using the electric motor 104 as a generator, or a combination of both. In some aspects, the battery system 108 may be adapted to fit within a utility box adapted to fit within the front portion of the bed of a pickup truck, as seen in FIG. 1. In some aspects, the batteries may be easily removable and replaceable. In the example of a utility box within the front portion of the bed of a pickup truck, the ease of the removal may allow for replacement with a charged battery system instead of recharging the batteries within the vehicle in some cases. Also, as the batteries may be quite expensive, this may allow easy removal from the vehicle at the end of the vehicle life for other reasons.

In some embodiments, the battery system may use 120 cells in series. The cells may be 3.3 volts for a total of 396 volts. The cells may be a Winston WB-LYP60AHA, for example. The cells may be lithium ion iron phosphate cells.

In some embodiments, the electric motor 104 is hard mounted to the vehicle, utilizing a universal joint forward and rearward of the electric motor, allows for the use of an electric motor better adapted for vehicle use. In some aspects, the electric motor may be an electric motor with a cooling sub-system, such as liquid coolant. In the case of a hard mounted electric motor, a front drive shaft and a rear drive shaft would be used. It is understood that a hard mounted system could include mounting with vibration dampening or other means of attachment. In the case of a retrofit to an existing vehicle, a proper fit to the existing vehicle transmission and differential may be achieved using a sliding yoke attachment on the front side of the electric motor, and using a U-joint on the rearward side of the electric motor. A hard mounted system is mounted relative to the vehicle frame or body, as opposed to floating with a traditional drive shaft. The electric motor is adapted to rotate with the same rotational velocity as the output shaft of the transmission.

In some embodiments, the auxiliary electric drive system utilizes a light duty pickup truck as the vehicle to be retrofitted with electric drive system. The electric motor may be attached motor mounting bracket affixed to a cross brace which is in turn attached to the vehicle frame. In some embodiments, the mounting may utilize bolts as fasteners for the components.

In some embodiments, the system may include a front drive shaft disconnect 106 and a rear drive shaft disconnect 105. The front drive shaft disconnect 106 may separate the front drive train into a forward section and a rearward section. The rear drive shaft disconnect 105 may separate the rear drive train into a forward section and a rearward section. With the drive shaft disconnects, the vehicle system may be implemented in a variety of different modes. For example, the OEM internal combustion engine may be disconnected when operating only in electric mode. Or, the rear disconnect may be disconnected to allow the electric motor to be driven, as a generator, by the OEM internal combustion engine to allow the system to work as an electrical generator, in field use, for example. The drive shaft disconnects may be similar to drive shaft disconnects in conjunction with towing vehicles behind other vehicles, such as made by Remco. The drive shaft disconnects may include electro-mechanical actuators to actuate the disconnection mechanism using electronic input from another portion of system.

Figure 4:
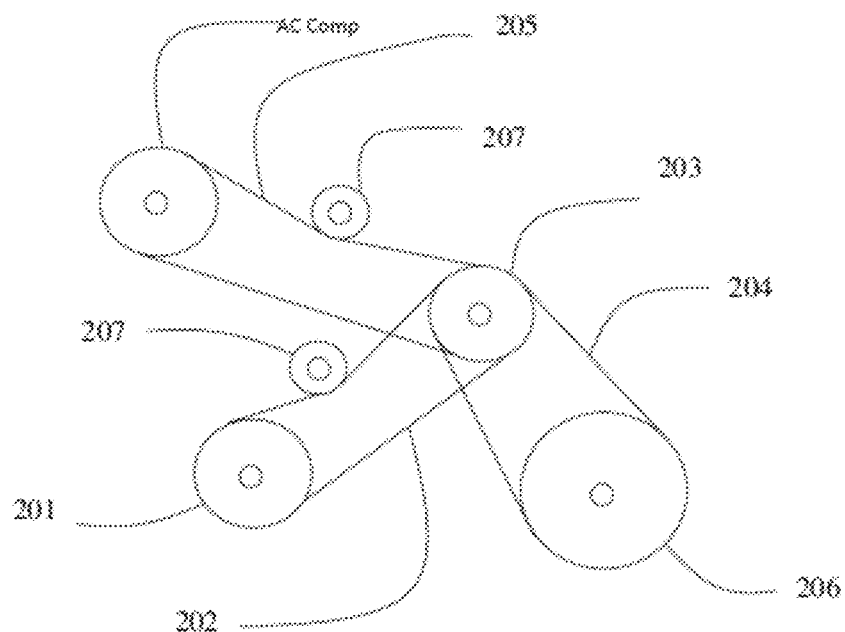
FIG. 4 illustrates a electric accessory belt drive system for a system according to some embodiments of the present invention.

Using FIG. 4 as an illustrative example, an internal combustion engine on a vehicle which may be modified using aspects of the present invention may use one or more serpentine belts to operate ancillary equipment. These belts may then drive the air conditioning unit, and the alternator, for example. There may be other equipment, such as a power steering pump, as well as idler pulleys in the belt system. In some aspects of the present invention, a vehicle may incorporate an E-belt drive system 200 which allows for the standard operation of the belt driven engine equipment when the internal combustion engine is operating, and also allows for the operation of belt driven engine equipment when the internal combustion engine is stopped and not rotating. In some embodiments, this is achieved using an electric motor 201 adapted to drive the belt system via a belt 202 when the internal combustion engine is stopped. In order to allow for the rotation of the belt around the crankshaft pulley while the crankshaft itself is not moving, an electronic clutching system may be utilized. A clutched belt pulley mechanism 203, allows for drive of the other belts 205 in a first mode, when the internal combustion engine is operating, and idles the belt 204 to the crankshaft pulley 206 when the crankshaft of the internal combustion engine is not operating. An electric belt drive motor 201 is used to drive the belt system when the internal combustion engine is not operating. Similarly to the crankshaft pulley, the electric belt drive motor 201 is adapted to idle while the internal combustion engine is operating, and is adapted to drive the belt when the internal combustion engine is not operating. In some embodiments, the electric belt drive motor is powered by the auxiliary batteries. The clutched belt pulley mechanism 203 may use electromagnetic clutches. For the retrofit of existing vehicles, the installation of the E-belt drive system may require the installation of an electric belt drive motor 201, the clutched belt pulley mechanism 203, and idler pulleys 207.

Figure 5:
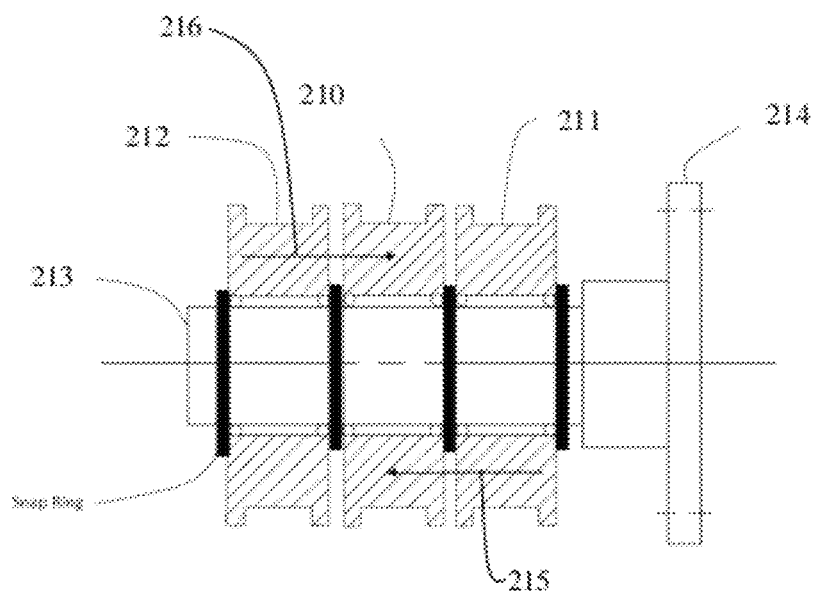
FIG. 5 is an illustration of a clutching mechanism for a belt drive system according to some embodiments of the present invention.

FIG. 5 illustrates a clutched belt pulley mechanism 203. The clutched belt pulley mechanism 203 may be mounted using a bracket 214. The clutched belt pulley mechanism 203 is adapted to allow a belt to drive engine components, such as air conditioning, for example. The clutched belt pulley mechanism 203 allows these engine components to be driven either using an electric belt drive motor 201 or the crankshaft pulley 206. The clutched belt pulley mechanism 203 may use electromechanical or electromagnetic clutches which allow the engine component belt 205 to be powered by just one of the available drive sources, while the other idles. For example, during an operational mode where the OEM internal combustion engine is operating, the OEM pulley 211 may be engaged 215 to the components pulley 210, while the electric belt drive motor pulley 216 idles. In an operational mode where the OEM internal combustion engine is not running, the electric belt drive motor pulley 216 be engaged 216 to the components pulley 210, while the OEM pulley 211 idles. The clutched belt pulley mechanism 203 may have all of its pulleys on a common shaft 213.

In some embodiments, the vehicle is adapted to run in a plurality of operating modes. In one mode, the vehicle may operate as a standard combustion engine vehicle, without drawing power from the electric system. In a some modes, the vehicle may operate as a dual power vehicle, wherein the combustion engine provides power and the electric motor also provides power. In another mode, the vehicle may operate as an electric vehicle only without power from the combustion engine. In another mode, the vehicle may be powered by the internal combustion engine, and the electric motor may act as a generator and recharge the batteries, and also be able to provide electrical power to other equipment, such as at field site.

The following modes are illustrative of modes that are available in a system according to some embodiments of the present invention.

Electric Mode: This mode may be used for just the electric motor as a source of power. The OEM engine 102 is not in operation. The OEM transmission 2 is not in operation. The front disconnect 106 is disengaged. The electric motor 3 is in operation. The rear disconnect 105 is engaged. The batteries 108 are in operation. The SCU is in operation. The belt drive system 200 is in operation.

Economy Mode: This mode may be used for realizing some fuel savings while using the electric motor in a lower capacity. The OEM engine 102 is in operation. The OEM transmission 2 is in operation. The front disconnect 106 is engaged. The electric motor 3 is in operation at a reduced torque rating, such as 15%. The rear disconnect 105 is engaged. The batteries 108 are in operation. The SCU is in operation. The belt drive system 200 is not in operation.

Towing Mode: This mode may be used when towing loads. The OEM engine 102 is in operation. The OEM transmission 2 is in operation. The front disconnect 106 is engaged. The electric motor 3 is in operation at a higher torque rating, such as 50%. The rear disconnect 105 is engaged. The batteries 108 are in operation. The SCU is in operation. The belt drive system 200 is not in operation.

Regeneration Mode: This mode is used to allow for recharging the batteries while driving. The OEM engine 102 is in operation. The OEM transmission 2 is in operation. The front disconnect 106 is engaged. The electric motor 3 is in operation as a generator at 10% charge. The rear disconnect 105 is engaged. The batteries 108 are in operation. The SCU is in operation. The belt drive system 200 is not in operation.

Performance Mode: This mode gives maximum power. The OEM engine 102 is in operation. The OEM transmission 2 is in operation. The front disconnect 106 is engaged. The electric motor 3 is in operation at 100% torque rating. The rear disconnect 105 is engaged. The batteries 108 are in operation. The SCU is in operation. The belt drive system 200 is not in operation.

Auxiliary Power Mode: This mode allows for the vehicle to operate as a generator for powering external electrical devices, which may hook into the vehicle at external power ports. The OEM engine 102 is in operation, which may be at 2500 rpm. The OEM transmission 2 is in operation. The front disconnect 106 is engaged. The electric motor 3 is in operation as a generator. The rear disconnect 105 is disengaged. The batteries 108 are not in operation. The SCU is in operation. The belt drive system 200 is not in operation.

Transport Mode: This mode allows for the vehicle to be towed by another vehicle. The OEM engine 102 is not in operation. The OEM transmission 2 is not in operation. The front disconnect 106 is disengaged. The electric motor 3 is not in operation. The rear disconnect 105 is disengaged. The batteries 108 are not in operation. The SCU is not in operation. The belt drive system 200 is not in operation.

Typically, the ECU (Engine Control Unit) or ECM (Engine Control Module) is what OEM (Original Equipment Manufacturers) use to operate all electronically controlled components that require computer instructions to operate.

In some embodiments, the AOEV Drive System does not use the OEM's ECU/ECM. Instead, the AOEV Drive System is electrically connected to the OEM vehicles 12 volt system through the ignition switch, or other appropriate location. When the ignition switch is in the RUN position, all OEM vehicle controls (such as headlights, tail lights, power windows, air bags, radio, etc.) that are normal to operation when the vehicle is being run with the combustion engine are active and functional including the speedometer and odometer. If the host OEM vehicle does not have an electronic method of revolution counter for the rear wheels as a method for monitoring speed and distance, the AOEV Drive System may include an electronic read switch mounted to one of the rear wheels to send such data to the VDM (Visual Display Monitor) which resides in the cabin area; most likely mounted to or on the vehicles dashboard. Thus, the dash console and the other powered accessories may continue to function as they would when the ICE is running even if the ICE is not running and stationary. As described above, the belt driven accessories may driven by an auxiliary electric motor. Thus, in some embodiments, these accessories may continue to utilize the vehicle's battery and alternator based electric system even when the ICE is not used.

Figure 2:
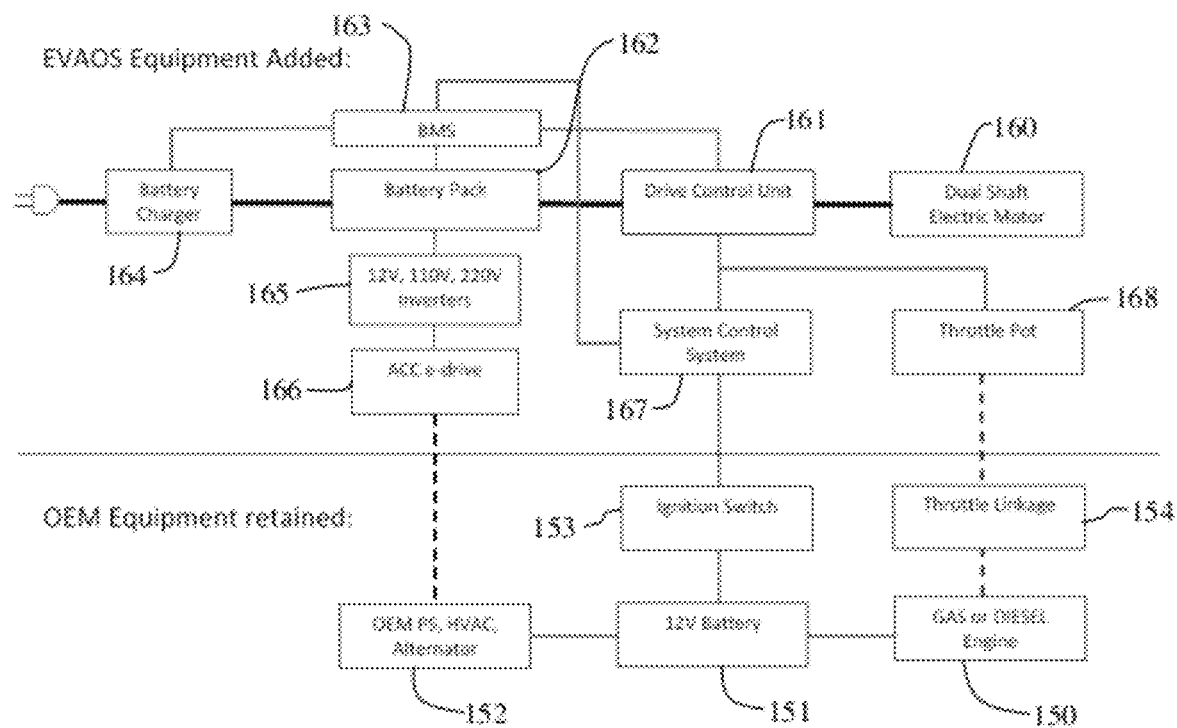
FIG. 2 illustrates a block diagram of a system with an auxiliary electric drive according to some embodiments of the present invention.

FIG. 2 illustrates a diagram of various components of the system. The system 100 uses components of the initial vehicle 101, including the OEM engine 150, the OEM battery 151, the OEM belt driven components 152, the OEM throttle linkage 154, and the OEM ignition switch 153. Added into the original vehicle are the electric motor 160, the electric motor drive control unit 161, the battery pack 162, the battery management system 163, the belt drive system 166, a batter charger 164, a throttle pot 168, and a system control system 167. Using a system as seen in FIG. 2, a system can be constructed that allows adding electric power pickup trucks and other vehicles. This may allow fleets of vehicles to reduce operating costs while meeting reduced emission targets.

In some embodiments of the present invention, a method for retrofitting an existing vehicle with an auxiliary electric drive system. The retrofitted vehicle may be a standard pickup truck is some embodiements. This retrofit may have the steps of removing the original drive shaft, and then installing an electric motor to the vehicle frame, which may use mounting brackets. The motor may be an electric motor with an input and an output shaft in some embodiments. A front drive shaft may be used to connect the back of the transmission to the front end of the electric motor, and a rear drive shaft may be used to connect the differential to the rear end of the electric motor. A disconnect may be present in both the front drive shaft and the rear drive shaft. A battery set may be installed into a box mounted within the front portion of the bed of the pickup truck. In some embodiments, the engine belt system may be modified such that the accessory belts can be clutched out of the belt driven system of the ICE. An electric drive motor may be mounted to allow drive of the belt system, and this electric drive motor may also be clutched so that it is out of the system when the ICE is in use.

The VDM provides control of the AOEV Drive System via an embedded microprocessor and software operating as a system control unit 109 (SCU). It includes a touch screen display so the driver/operator has a tactile and visual interface during use. The SCU is adapted to allow a user to select from the various modes of operation for the vehicle system.

In some embodiments of the present invention, the vehicle may include an energy storage module. The energy storage module may be adapted to provide power in the form of 12V, 110V, and/or 220V. The energy storage module may contain inverters which may connect to external outlets. In this fashion, devices may be powered, for example by emergency vehicles when using vehicles having a power system according to embodiments of the present invention.

Figures 6A, 6B:
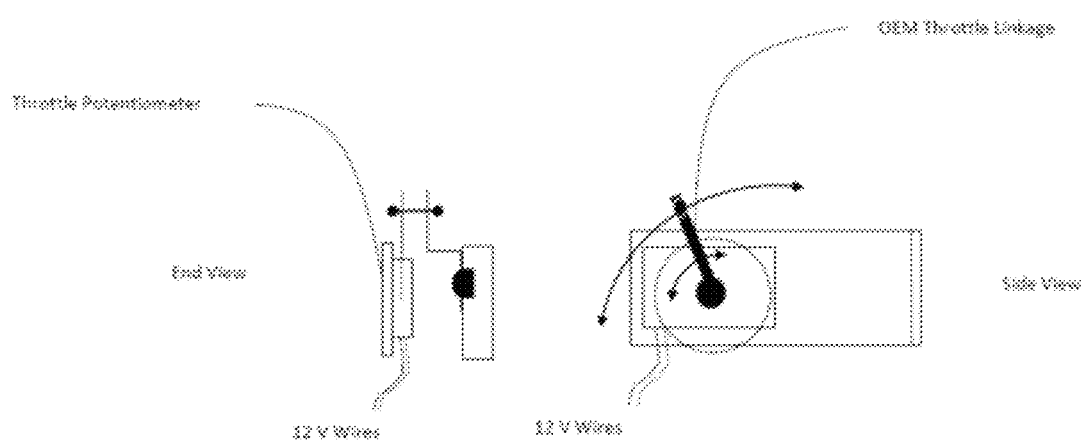
FIGS. 6A-B are views of a throttle linkage according to some embodiments of the present invention.

FIGS. 6A-B illustrate a throttle pot for the electric vehicle system according to some embodiments of the present invention. The vehicle's OEM throttle may be attached to in order to also provide control to the electric motor SCU.

Figure 8:
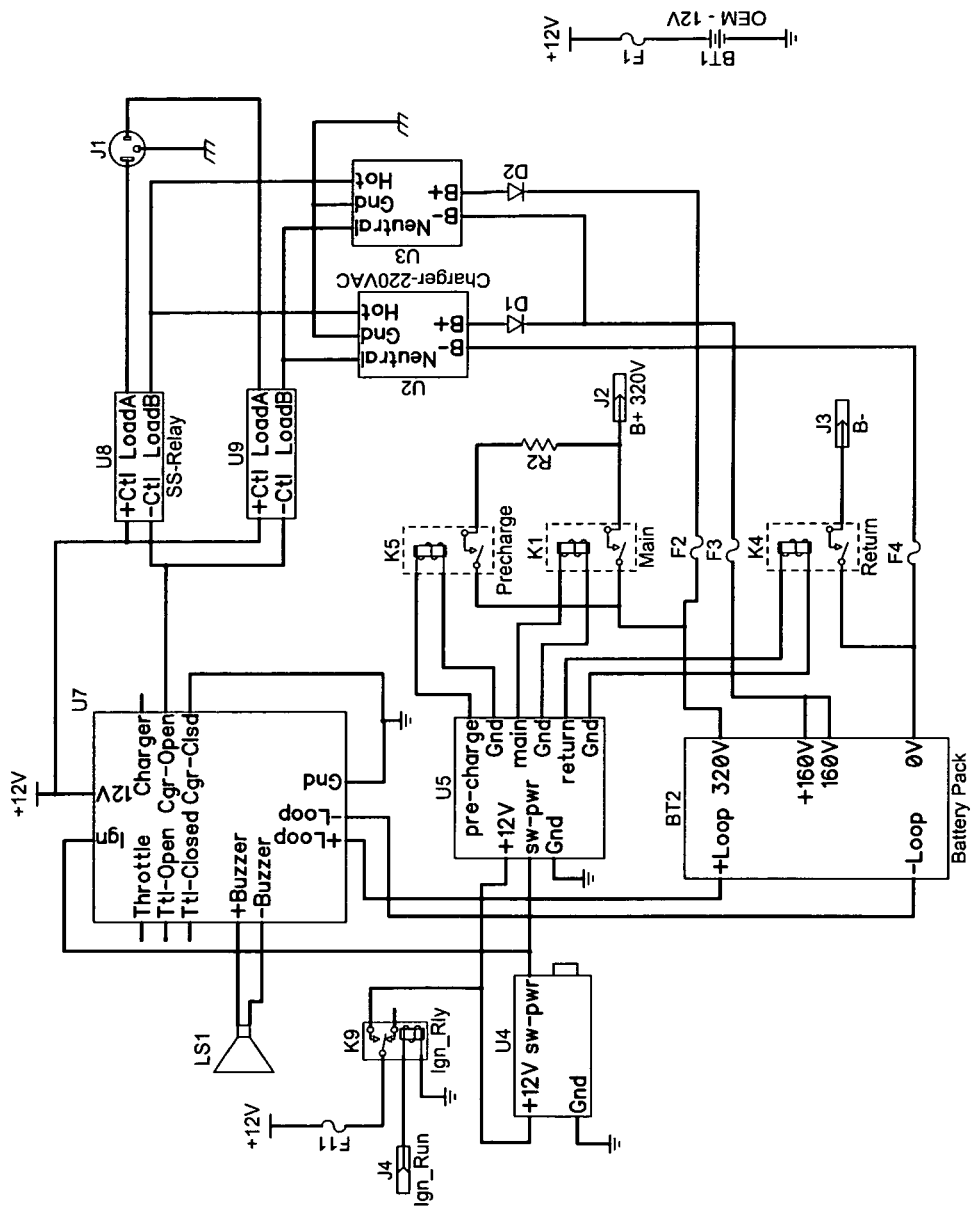
FIG. 8 is a schematic of an electric vehicle circuit according to some embodiments of the present invention.
Figure 9:
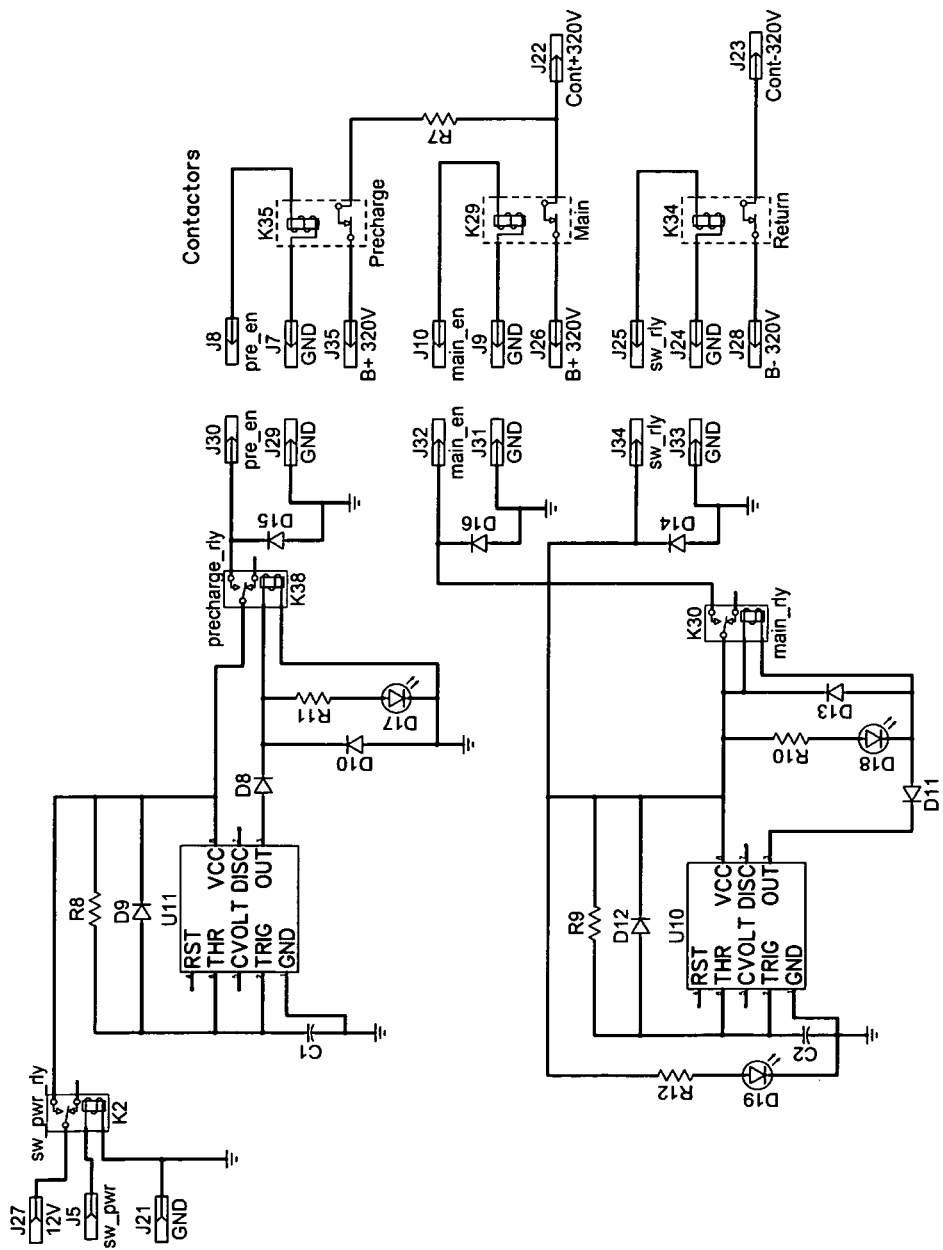
FIG. 9 is a schematic of a contactor relay board according to some embodiments of the present invention.

FIG. 8 illustrates a system schematic according to some embodiments of the present invention. FIG. 9 illustrates contactor relays according to some embodiments of the present invention.

As evident from the above description, a wide variety of embodiments may be configured from the description given herein and additional advantages and modifications will readily occur to those skilled in the art. The invention in its broader aspects is, therefore, not limited to the specific details and illustrative examples shown and described. Accordingly, departures from such details may be made without departing from the spirit or scope of the applicant's general invention.

I claim:

1. A vehicle system comprising:
   an internal combustion engine;
   a transmission coupled to the internal combustion engine on a first end;
   a front drive train portion connected to a second end of the transmission;
   a rear drive train portion;
   a disconnect connected inline to the front drive train portion; and
   an electric drive assembly coupled to the front drive train portion on a first end and coupled to the rear drive train portion on a second end; wherein
   the disconnect is located between the transmission and the electric drive assembly and selectively decouples the electric drive assembly and the front drive train portion, wherein the rear drive train portion comprises:
   a first end coupled to the electric drive assembly;
   a second end coupled to a vehicle differential; and
   a second disconnect, wherein the second disconnect is located between the electric drive assembly and the differential with the second disconnect being adapted to couple and decouple torque from the first end of the rear drive train portion to the second end of the rear drive train portion.

2. The vehicle system of claim 1, wherein the electric drive assembly is adapted to receive input torque from the transmission and to deliver output torque to at least one drive wheel of the vehicle.

3. The vehicle system of claim 2, wherein the electric drive assembly comprises a motor mounted to the frame of the vehicle.

4. The vehicle system of claim 3, wherein the motor is in line with a torque transmission portion of the vehicle's internal combustion engine.

5. The vehicle system of claim 1 wherein the front drive train portion comprises:
   a first end coupled to the transmission;
   a second end coupled to the first end of the electric drive assembly; wherein
   the disconnect is adapted to couple and decouple torque from the first end of the front drive train portion to the second end of the front drive portion.

6. The vehicle system of claim 1 wherein the electric drive assembly comprises a single first shaft, the first shaft extending out of the drive assembly housing on two ends, the electric drive assembly adapted to be mounted in line with a torque delivery system of the internal combustion engine.

7. The vehicle system of claim 1 wherein the electric drive assembly comprises a single first shaft, the first shaft extending out of the drive assembly housing on two ends, the electric drive assembly adapted to be mounted in line with a torque delivery system of the internal combustion engine.

8. The vehicle system of claim 1 wherein the disconnect is a drive shaft disconnect that connects a first forward drive shaft to a second forward drive shaft for selectively disconnecting the two forward drive shafts.

9. The vehicle system of claim 1 wherein the second disconnect is a drive shaft disconnect that connects a first rearward drive shaft to a second rearward drive shaft for selectively disconnecting the two rearward drive shafts.

10. A method for the operation of a vehicle with an electric motor and an internal combustion engine, said method comprising the steps of:
    selecting whether to drive the vehicle with the aid of the electric motor;
    selecting whether to drive the vehicle with the aid of the internal combustion motor;
    selecting whether to engage a front disconnect, said front disconnect residing between the transmission of the vehicle and the electric motor;
    selecting whether to engage a rear disconnect, said rear disconnect residing between said electric motor and the differential of the vehicle; and
    selecting whether to isolate the electric motor between the transmission and the differential by disengaging the front disconnect and the rear disconnect.

11. The method of claim 10 wherein said electric motor comprises an input shaft coupled to the transmission and an output shaft coupled to the differential.

12. A vehicle system comprising:
    an internal combustion engine;
    a transmission coupled to the internal combustion engine on a first end;
    a differential; and
    an electric drive assembly positioned between and isolated from the transmission and the differential by a first disconnect connected between the transmission and the electric drive assembly and a second disconnect connected between the electric drive assembly and the differential; the first disconnect selectively decouples the electric drive assembly and the transmission and the second disconnect selectively decouples the electric drive assembly and the differential.

13. The vehicle system of claim 12 wherein the electric drive assembly comprises a motor mounted to the frame of the vehicle.

14. The vehicle system of claim 13 wherein the electric drive assembly is in line with a torque transmission portion of the internal combustion engine.

15. The vehicle system of claim 14 wherein the first disconnect connects to the transmission by a first forward drive shaft and to the electric drive assembly by a second forward drive shaft, wherein the disconnect is adapted to couple and decouple torque from the first forward drive shaft and the second forward drive shaft.

16. The vehicle system of claim 15 wherein the second disconnect connects to the electric drive assembly by a first rearward drive shaft and to the differential by a second rearward drive shaft, wherein the disconnect is adapted to couple and decouple torque from the first rearward drive shaft and the second rearward drive shaft.

17. The vehicle system of claim 16 wherein the electric drive assembly comprises a single first shaft, the first shaft extending out of the drive assembly housing on two ends and connecting to the second forward drive shaft on one end and the second rearward drive shaft on the other end.

18. The vehicle system of claim 17 wherein the disconnect is a drive shaft disconnect that connects the first forward drive shaft to the second forward drive shaft for selectively disconnecting the two forward drive shafts.

19. The vehicle system of claim 18 wherein the second disconnect is a drive shaft disconnect that connects the first rearward drive shaft to the second rearward drive shaft for selectively disconnecting the two rearward drive shafts.

\* \* \* \* \*